(12) United States Patent
Nakagawa et al.

(10) Patent No.: US 10,304,171 B2
(45) Date of Patent: May 28, 2019

(54) PROJECTION CONTROL DEVICE, PROJECTION CONTROL METHOD, AND NON-TRANSITORY STORAGE MEDIUM

(71) Applicant: CASIO COMPUTER CO., LTD., Tokyo (JP)

(72) Inventors: Atsushi Nakagawa, Suginami-ku (JP); Tetsuro Narikawa, Hamura (JP); Toru Takahama, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/730,955

(22) Filed: Oct. 12, 2017

(65) Prior Publication Data

US 2018/0182115 A1 Jun. 28, 2018

(30) Foreign Application Priority Data

Dec. 22, 2016 (JP) ................................ 2016-249960

(51) Int. Cl.
*H04N 5/74* (2006.01)
*G06T 7/564* (2017.01)
*G06T 5/00* (2006.01)
*H04N 9/31* (2006.01)
*G09G 5/36* (2006.01)
*G09G 5/00* (2006.01)

(52) U.S. Cl.
CPC .............. *G06T 5/006* (2013.01); *G06T 7/564* (2017.01); *G09G 5/00* (2013.01); *G09G 5/36* (2013.01); *H04N 5/74* (2013.01); *H04N 9/31* (2013.01)

(58) Field of Classification Search
CPC ............................. H04N 19/167; G06T 5/006
See application file for complete search history.

(56) References Cited

U.S. PATENT DOCUMENTS

| 6,175,652 | B1 * | 1/2001 | Jacobson | ............... | C30B 15/26 |
| | | | | | 117/14 |
| 6,373,603 | B1 * | 4/2002 | Popovich | ................. | G02B 5/32 |
| | | | | | 348/744 |
| 7,145,633 | B2 * | 12/2006 | Nishimoto | .............. | G03F 7/703 |
| | | | | | 355/47 |
| 7,525,656 | B2 * | 4/2009 | Kadono | .................... | G01J 4/04 |
| | | | | | 356/364 |
| 9,599,463 | B2 * | 3/2017 | Yamashita | ......... | G01B 11/2513 |

(Continued)

FOREIGN PATENT DOCUMENTS

JP 2015-173431 A 10/2015

*Primary Examiner* — Paulos M Natnael
(74) *Attorney, Agent, or Firm* — Fitch, Even, Tabin & Flannery LLP

(57) ABSTRACT

A projection control device includes a hardware processor. The hardware processor acquires a feature of a projection surface. The hardware processor determines a first area in which a first projection image corrected based on the acquired feature of the projection surface is projected and a second area that is other than the first area and in which a second projection image corrected based on the feature of the projection surface is projected, within a projection area projectable, by a projection device, on the projection surface. Then, the hardware processor controls the projection device to project the first projection image in the first area and project the second projection image in the second area.

11 Claims, 9 Drawing Sheets

(56) References Cited

U.S. PATENT DOCUMENTS

| | | | |
|---|---|---|---|
| 2001/0012444 A1* | 8/2001 | Ito | H04N 5/44543 386/248 |
| 2004/0179190 A1* | 9/2004 | Miyashita | G03F 7/706 356/124 |
| 2007/0046922 A1* | 3/2007 | Kadono | G01J 4/04 355/71 |
| 2009/0184887 A1* | 7/2009 | Mizuno | G06F 3/1423 345/1.1 |
| 2011/0134225 A1* | 6/2011 | Saint-Pierre | G01B 11/03 348/47 |
| 2012/0128238 A1* | 5/2012 | Kameyama | G06T 3/4053 382/159 |
| 2014/0001346 A1* | 1/2014 | Chen | G01J 1/42 250/221 |
| 2015/0084992 A1* | 3/2015 | Wada | G06T 5/006 345/647 |
| 2015/0215568 A1* | 7/2015 | Karasawa | H04N 9/3179 348/745 |
| 2016/0265906 A1* | 9/2016 | Yamashita | G01B 11/2513 |
| 2017/0172419 A1* | 6/2017 | Oishi | A61B 5/0095 |
| 2017/0276309 A1* | 9/2017 | Nakazawa | F21S 41/143 |

* cited by examiner

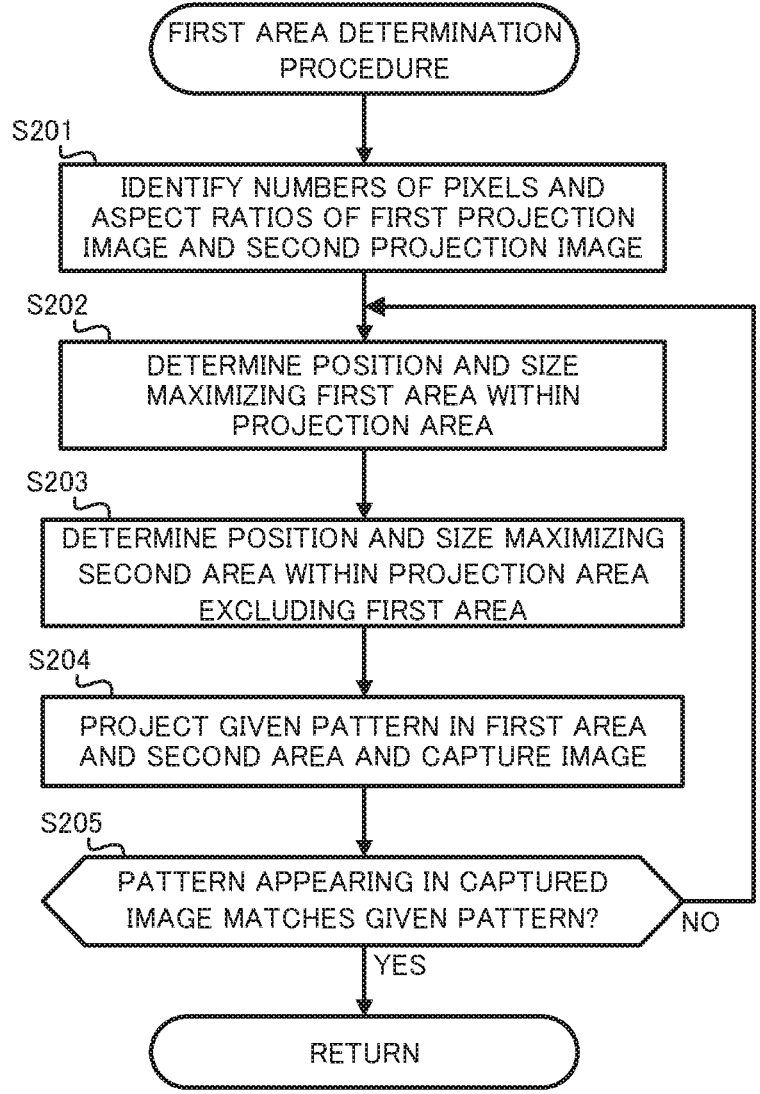

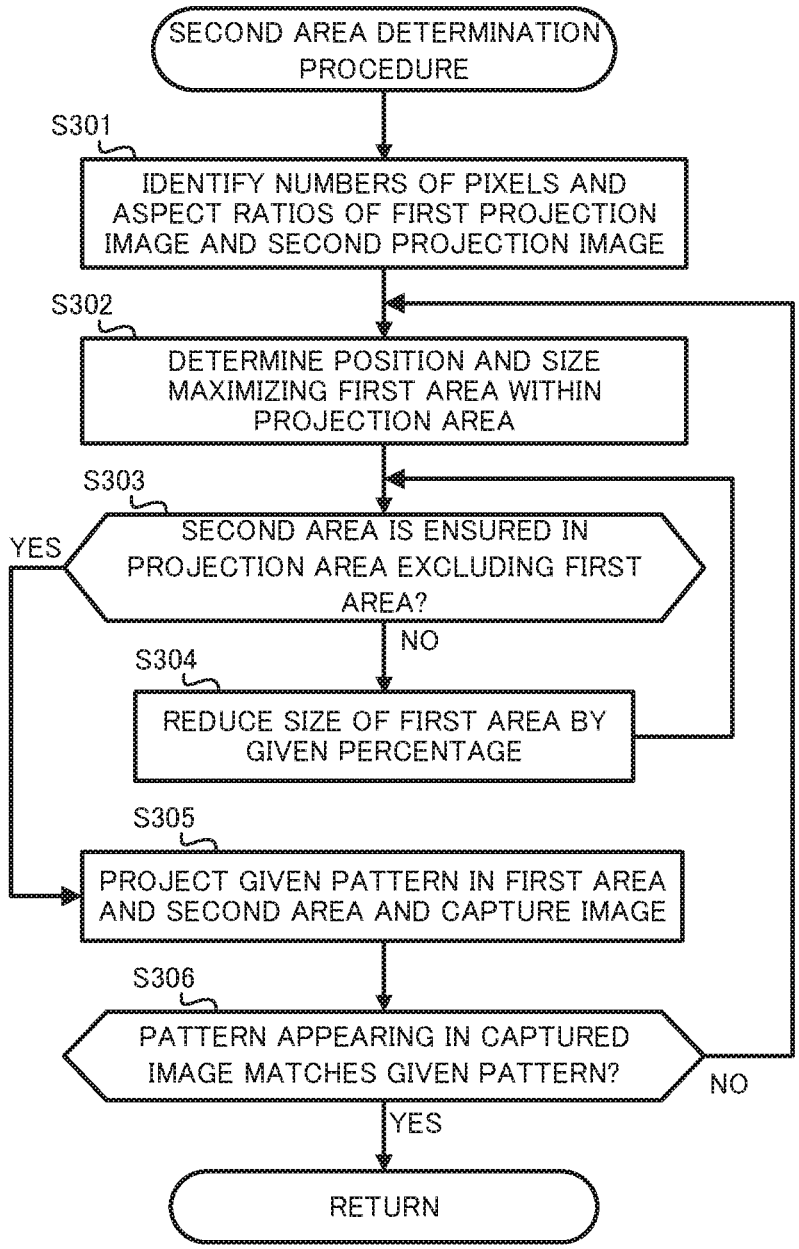

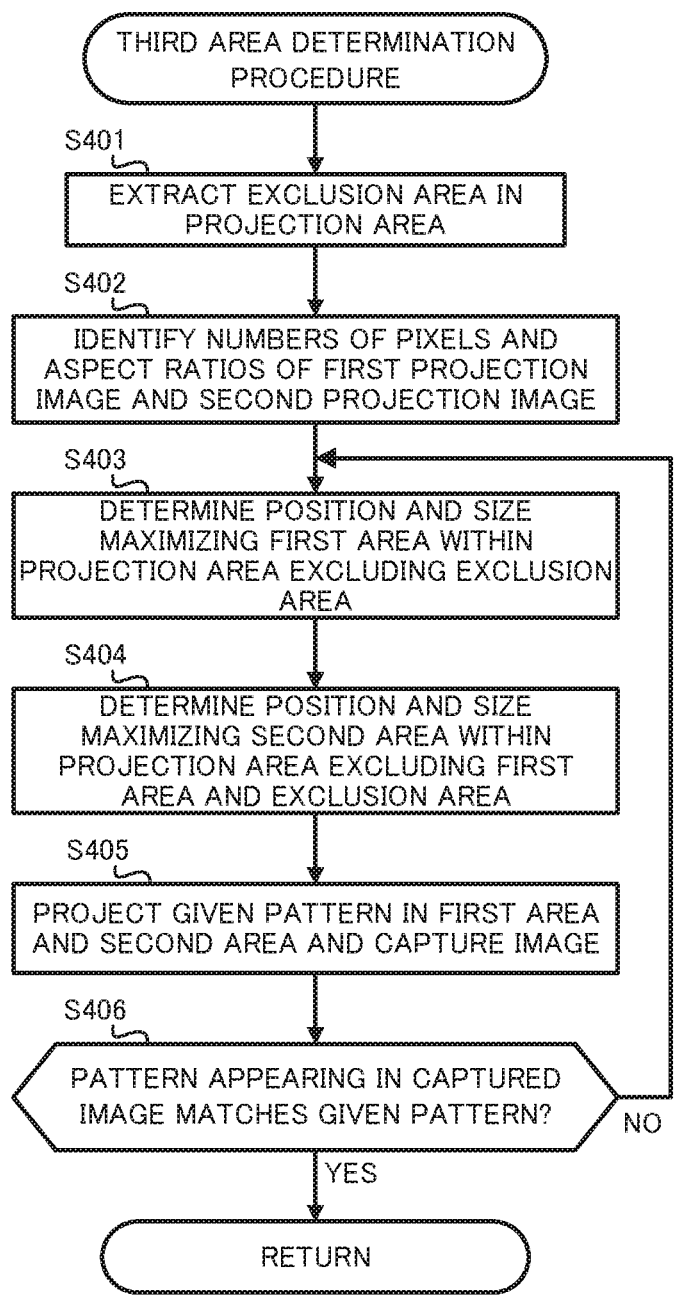

PROJECTION CONTROL DEVICE, PROJECTION CONTROL METHOD, AND NON-TRANSITORY STORAGE MEDIUM

CROSS-REFERENCE TO RELATED APPLICATION

This application claims the benefit of Japanese Patent Application No. 2016-249960, filed on Dec. 22, 2016, the entire disclosure of which is incorporated by reference herein.

FIELD

This application relates generally to a projection control device, a projection control method, and a non-transitory storage medium.

BACKGROUND

In the related art, in order for a projection device such as a projector to properly project even if the projection surface is a curved surface, there are techniques of determining the correspondence between projection pixels of the projection device and captured image pixels of an imaging device capturing an image of the projection surface and correcting based on the correspondence and projecting a projection image (for example, see Unexamined Japanese Patent Application Publication No. 2015-173431).

Generally, when a projection image is corrected and output as disclosed in the Unexamined Japanese Patent Application Publication No. 2015-173431, a projection image reduced in size to a projection area over which the projection device can project is projected for keeping the aspect ratio of the projection image. Therefore, a problem is that wasted space in which no projection image is projected occurs within the projection area.

SUMMARY

One aspect of the present invention is summarized as a projection control device includes a hardware processor, wherein the hardware processor is configured to: acquire a feature of a projection surface; determine a first area in which a first projection image corrected based on the acquired feature of the projection surface is projected and a second area that is other than the first area and in which a second projection image corrected based on the feature of the projection surface is projected, within a projection area projectable, by a projection device, on the projection surface; and control the projection device to project the first projection image in the first area and project the second projection image in the second area.

Other aspect of the present invention is summarized as a projection control method comprising: a feature acquisition step of acquiring a feature of a projection surface; an area determination step of determining a first area in which a first projection image corrected based on the acquired feature of the projection surface is projected and a second area that is other than the first area and in which a second projection image corrected based on the feature of the projection surface is projected, within a projection area projectable, by a projection device, on the projection surface; and a projection control step of controlling the projection device to project the first projection image in the first area and project the second projection image in the second area.

Other aspect of the present invention is summarized as a non-transitory storage medium encoded with a computer-readable program that enables a computer to execute a method comprising: acquiring a feature of a projection surface; determining a first area in which a first projection image corrected based on the acquired feature of the projection surface is projected and a second area that is other than the first area and in which a second projection image corrected based on the feature of the projection surface is projected within a projection area projectable, by a projection device, on the projection surface; and controlling the projection device to project the first projection image in the first area and project the second projection image in the second area.

According to the present disclosure, the projection area can usefully be used.

BRIEF DESCRIPTION OF THE DRAWINGS

A more complete understanding of this application can be obtained when the following detailed description is considered in conjunction with the following drawings, in which:

FIG. 7 is a chart showing an exemplary flowchart of the first area determination procedure according to the embodiment;

FIG. 8 is a chart showing an exemplary flowchart of the second area determination procedure according to the embodiment; and FIG. 9 is a chart showing an exemplary flowchart of the third area determination procedure according to the embodiment.

DETAILED DESCRIPTION

An embodiment of the present disclosure will be described below with reference to the drawings.

Figure 1:
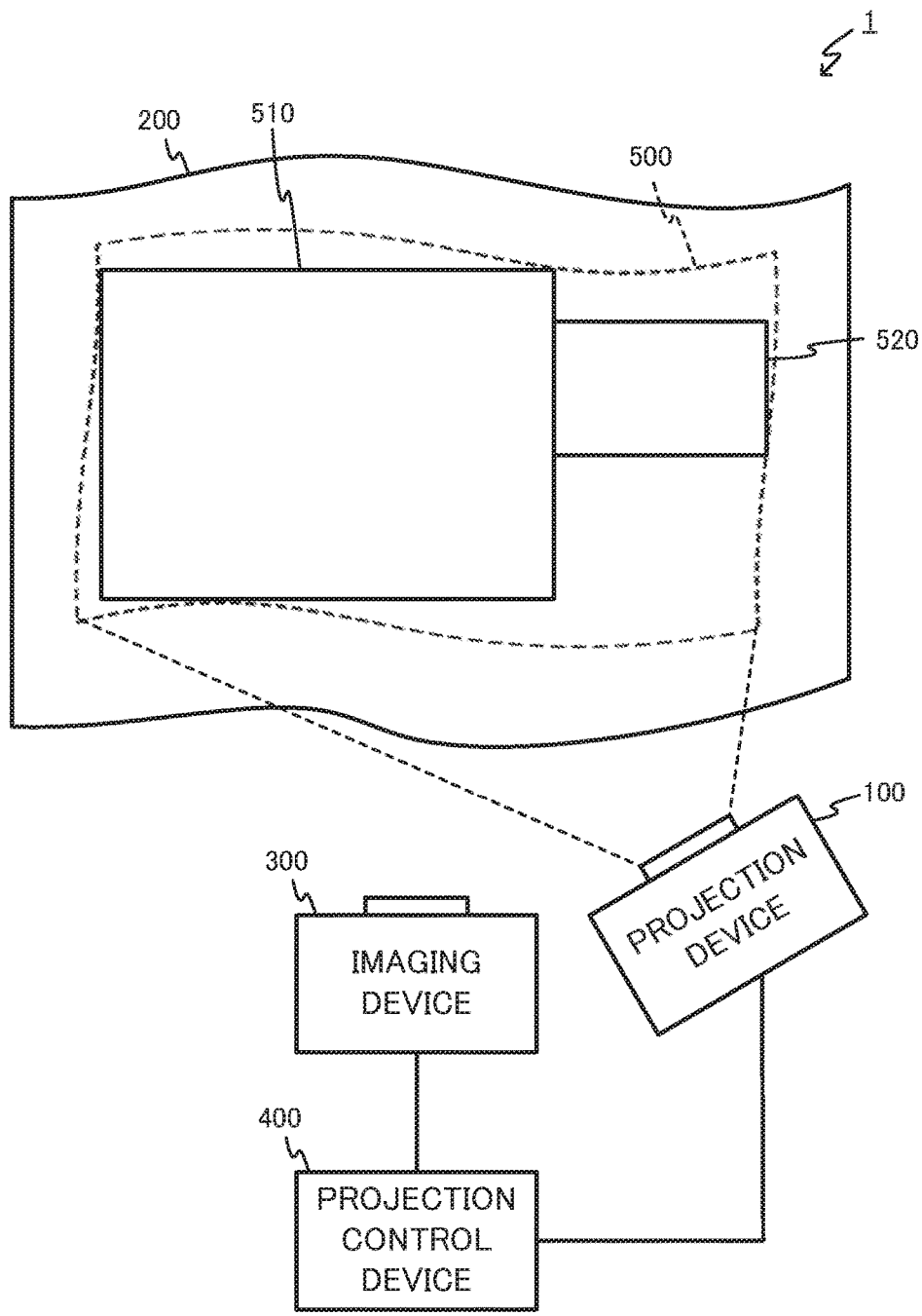
FIG. 1 is an illustration showing the external configuration of the projection control system according to an embodiment of the present disclosure.

FIG. 1 is an illustration showing the external configuration of a projection control system 1 according to an embodiment of the present disclosure. The projection control system 1 comprises a projection device 100, a projection surface 200, an imaging device 300, and a projection control device 400.

The projection device 100 is a device projecting a content on the projection surface 200 and comprises a projector including a projection lens, a projection element, a light source, and the like. The projection device 100 acquires a content stored in a not-shown external storage via the projection control device 400 and projects the content on the projection surface 200. In this embodiment, the projection device 100 projects, as a content, a first projection image in a first area 510 and a second projection image in a second area 520 of a projection area 500 over which the projection device 100 can project on the projection surface 200.

The projection surface 200 is a surface on which an image or a video projected by the projection device 100 is projected. The projection surface 200 is, for example, a wall of a building or a screen.

The imaging device 300 comprises a camera including an image sensor such as a charge coupled device (CCD) and a complementary metal oxide semiconductor (CMOS).

The imaging device 300 captures an image of a projection image projected on the projection surface 200 and outputs the captured image to the projection control device 400.

The projection control device 400 is communicably wireless-connected or wired-connected to the projection device 100 and the imaging device 300 and outputs to the projection device 100 a content for the projection device 100 to project. Moreover, in this embodiment, the projection control device 400 corrects and outputs to the projection device 100 a content so as to be properly projected according to the shape and the color of the projection surface 200.

The configuration of the projection control device 400 will be described in detail next.

Figure 2:
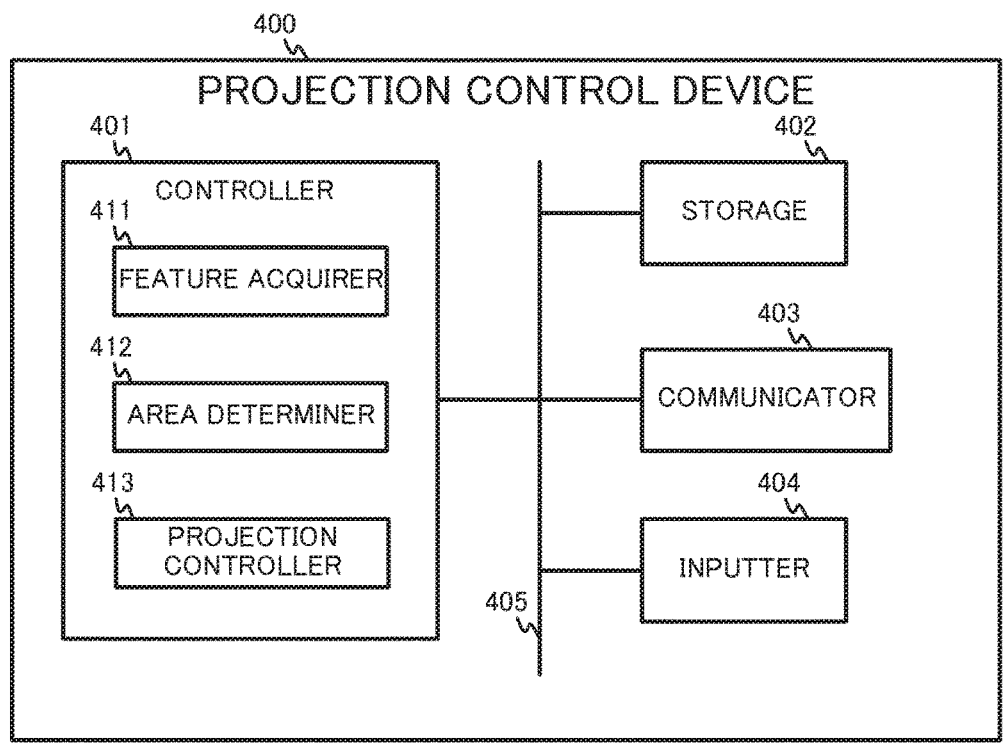
FIG. 2 is a schematic diagram showing the configuration of the projection control device according to the embodiment.

FIG. 2 is a schematic diagram showing the configuration of the projection control device 400. As shown in FIG. 2, the projection control device 400 comprises a controller 401, a storage 402, a communicator 403, and an inputter 404, and these parts are connected by a bus 405.

The controller 401 comprises a central processing unit (CPU), a read only memory (ROM), and a random access memory (RAM). The controller 401 executes programs stored in the ROM (for example, a program regarding the area determination procedure described later) to realize the functions of a feature acquirer 411, an area determiner 412, and a projection controller 413 described later.

The storage 402 is a nonvolatile memory such as a hard disk drive (HDD).

The communicator 403 comprises a communication interface for communicably connecting the projection control device 400 to the projection device 100 and the imaging device 300.

The inputter 404 comprises an input device such as buttons, a keyboard, and a touch panel. The inputter 404 receives operation input from the user of the projection control device 400 and outputs to the controller 401 a signal corresponding to the received operation input.

The functional configuration of the controller 401 of the projection control device 400 will be described next. As shown in FIG. 2, the controller 401 functions as a feature acquirer 411, an area determiner 412, and a projection controller 413.

The feature acquirer 411 acquires features of the projection surface 200. In this embodiment, the feature acquirer 411 acquires information regarding the shape of the projection surface 200 (shape information) and information regarding the color of the projection surface 200 (color information) as features of the projection surface 200.

First, acquisition of the shape information by the feature acquirer 411 will be described. Generally, when the projection surface 200 is a curved surface, a projection image projected by the projection device 100 is projected on the projection surface 200 in a distorted manner. Therefore, in order to eliminate the distortion and project a projection image on the projection surface 200 in a proper shape, the feature acquirer 411 acquires as shape information the correspondence between projection pixels of the projection device 100 and captured image pixels of the imaging device 300. As an example of the method of acquiring the shape information, for example, the feature acquirer 411 projects a given pattern comprising a bright part and a dark part based on the Gray codes on the projection surface 200 by means of the projection device 100 and captures an image of the pattern by means of the imaging device 300. Then, the feature acquirer 411 determines the correspondence between projection pixels of the projection device 100 and captured image pixels of the imaging device 300 based on the projection image and the captured image.

Acquisition of the color information by the feature acquirer 411 will be described next. Generally, when the projection surface 200 is not white and/or has a pattern, a projection image projected by the projection device 100 mixes with the color and/or the pattern of the projection surface 200 and is not projected in desired colors. Therefore, in order to eliminate influence of the color and/or the pattern of the projection surface 200 and project a projection image on the projection surface 200 in proper colors, for example, the feature acquirer 411 captures an image of the projection surface 200 by means of the imaging device 300, and calculates based on the captured image and acquires as color information a correction amount for each pixel for canceling the color and/or the pattern of the projection surface 200.

The area determiner 412 determines a first area 510 in which a first projection image corrected based on the feature acquired by the feature acquirer 411 is projected and a second area 520 that is other than the first area 510 and in which a second projection image corrected based on the feature acquired by the feature acquirer 411 is projected within the projection area 500 over which the projection device 100 can project on the projection surface 200.

In this embodiment, the first projection image is a main content projected on the projection surface 200. On the other hand, the second projection image is a sub content of the main content projected as the first projection image. For example, when the first projection image is a video, the second projection image is an image presenting information relating to the video such as closed caption. Moreover, besides an image presenting information relating to the first projection image, the second projection image may be, for example, an image presenting information presenting the current time or emergency information such as a warning message, an alarming message, and breaking news.

Moreover, in this embodiment, the area determiner 412 determines the first area 510 and the second area 520 by a method selected by the user among three methods of determining the first area 510 and the second area 520 described later.

Figure 3A:
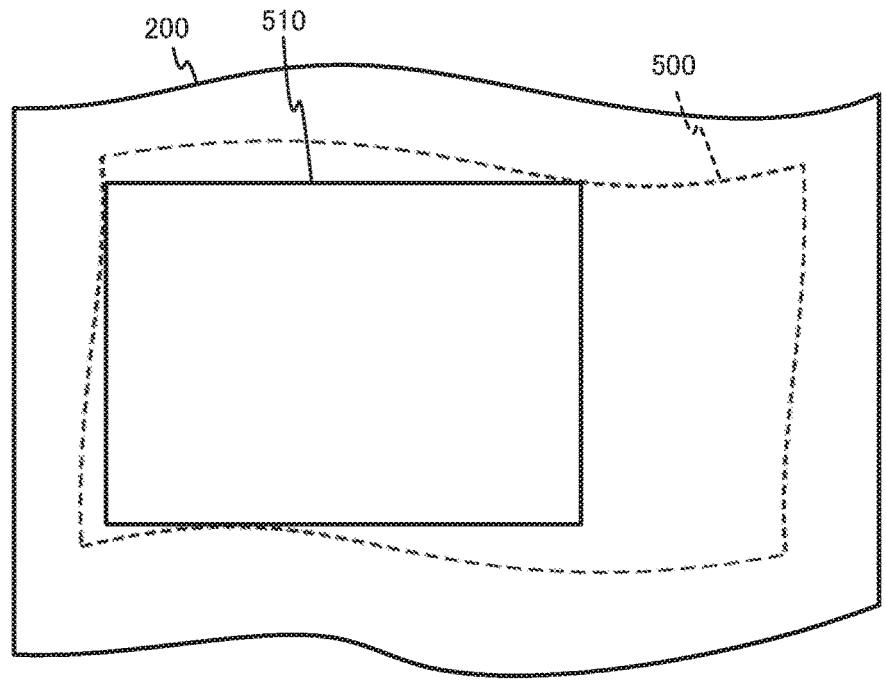
FIGS. 3A and 3B are illustrations for explaining an example of the method of determining the first area and the second area.
Figure 3B:
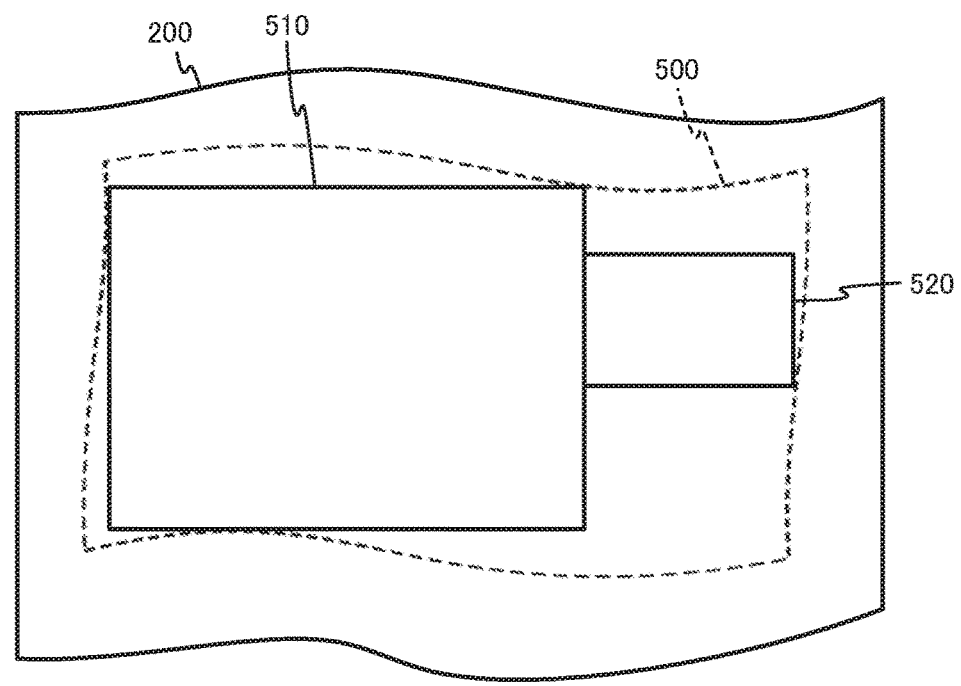

The area determiner 412 determines a first area 510 maximized within the projection area 500 and determines a second area 520 maximized within the projection area 500 excluding the determined first area 510. For example, first, the area determiner 412 identifies the number of pixels and the aspect ratio of each of the first projection image and the second projection image. Then, as shown in FIG. 3A, the area determiner 412 determines, based on the identified number of pixels and aspect ratio of the first projection image, the position and size maximizing the first area 510 in which the first projection image corrected based on the shape information acquired by the feature acquirer 411 is projected within the projection area 500. Then, as shown in FIG. 3B, the area determiner 412 determines, based on the identified number of pixels and aspect ratio of the second projection image, the position and size maximizing the second area 520 in which the second projection image corrected based on the shape information acquired by the feature acquirer 411 is projected within the projection area 500 excluding the determined first area 510.

Figure 4A:
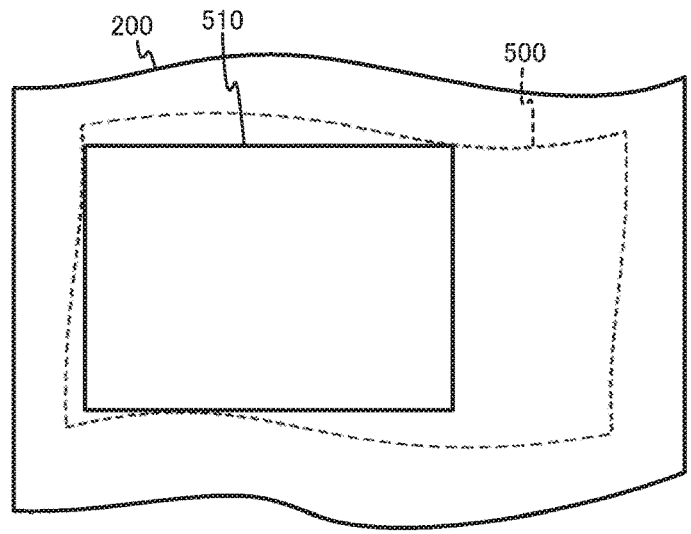
FIGS. 4A, 4B, and 4C are illustrations for explaining another example of the method of determining the first area and the second area.
Figure 4B:
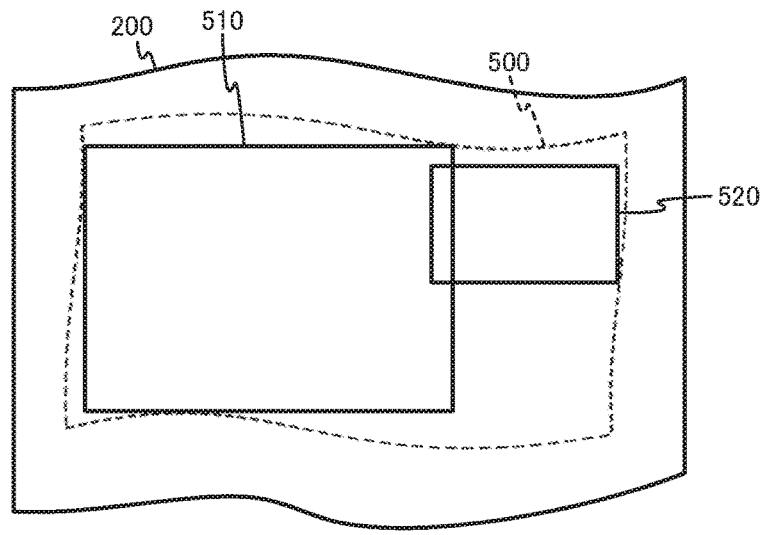
Figure 4C:
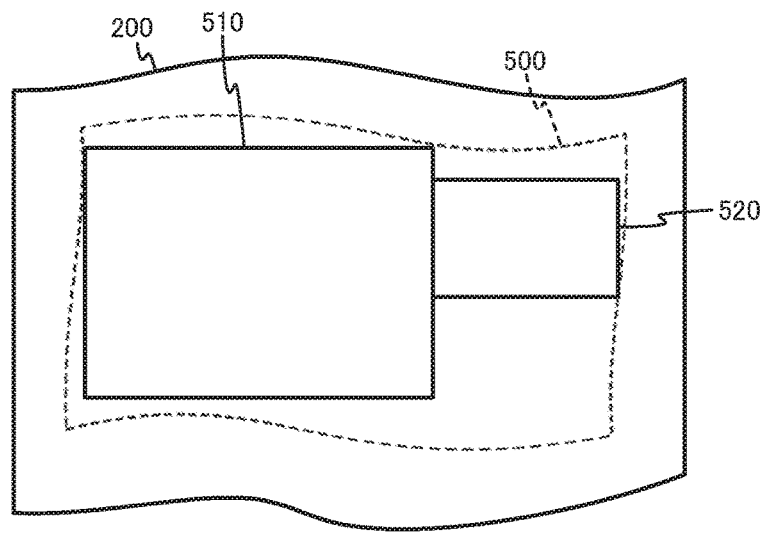

Alternatively, the area determiner 412 may determine a second area 520 of a given size and determine a first area 510 maximized within the projection area 500 excluding the determined second area 520. For example, first, the area determiner 412 identifies the number of pixels and the aspect ratio of each of the first projection image and the second projection image. Then, as shown in FIG. 4A, the area determiner 412 determines, based on the identified number of pixels and aspect ratio of the first projection image, the position and size maximizing the first area 510 in which the first projection image corrected based on the shape information acquired by the feature acquirer 411 is projected within the projection area 500. Then, as shown in FIG. 4B, the area determiner 412 determines, based on the identified number of pixels and aspect ratio of the second projection image, whether the second area 520 of a given size in which the second projection image corrected based on the shape information acquired by the feature acquirer 411 is projected is ensured within the projection area 500 excluding the determined first area 510. If the area determiner 412 determines that the second area 520 of a given size is not ensured within the projection area 500 excluding the determined first area 510 as shown in FIG. 4B, the area determiner 412 reduces the size of the first area 510 by a given percentage at a time and determines whether the second area 520 of a given size is ensured. Then, as shown in FIG. 4C, the area determiner 412 determines the position and size of the maximum first area 510 ensuring the second area 520 and the position of the second area 520.

Figure 5A:
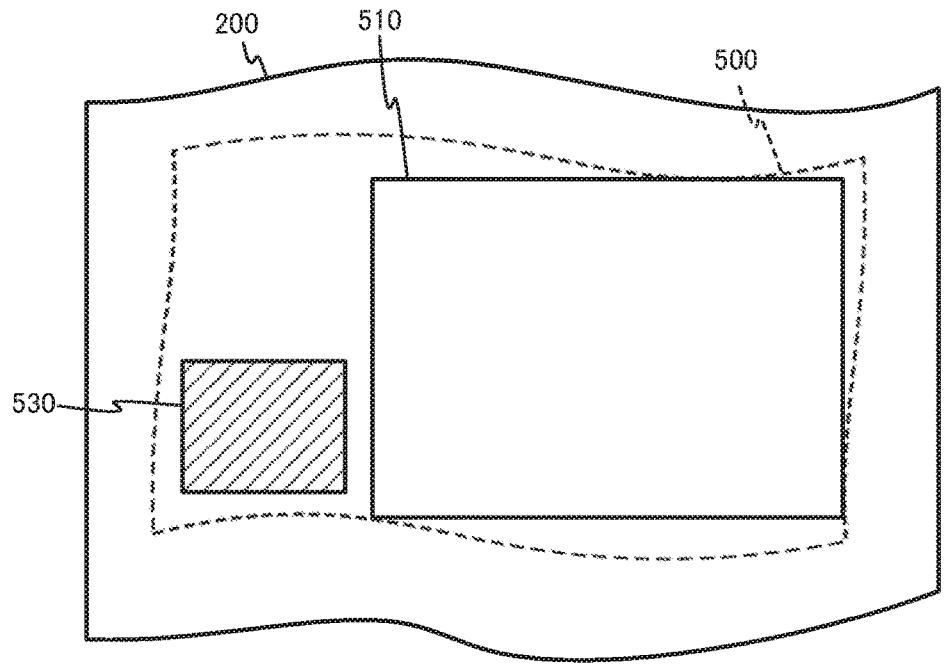
FIGS. 5A and 5B are illustrations for explaining another example of the method of determining the first area and the second area.
Figure 5B:
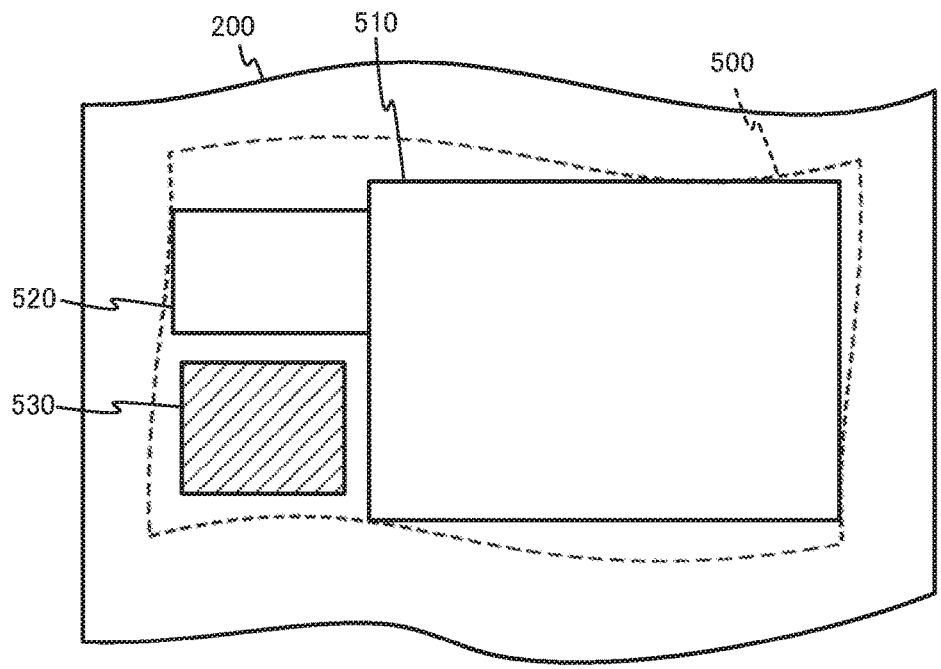

Moreover, the area determiner 412 may determine a first area 510 maximized within an area of the projection area 500 in which the contrast of the first projection image satisfies a given condition, and determine a second area 520 maximized within the projection area 500 excluding the determined first area 510. For example, first, the area determiner 412 extracts an exclusion area 530 of the projection area 500 in which the contrast of the first projection image does not satisfy a given condition based on the color information acquired by the feature acquirer 411. Here, the given condition is that, for example, the contrast ratio of the first projection image projected on the projection surface 200 is equal to or higher than a given value. The area determiner 412 extracts, as shown in FIG. 5A, an exclusion area 530 on the projection surface 200 in which because of low reflectance (dark color), projected light from the projection device 100 fails to cancel the color of the projection surface 200 and the contrast of the first projection image does not satisfy the given condition. Moreover, the area determiner 412 identifies the number of pixels and the aspect ratio of each of the first projection image and the second projection image. Then, the area determiner 412 determines, based on the identified number of pixels and aspect ratio of the first projection image, the position and size maximizing the first area 510 in which the first projection image corrected based on the shape information acquired by the feature acquirer 411 is projected within the projection area 500 excluding the exclusion area 530. Then, as shown in FIG. 5B, the area determiner 412 determines, based on the identified number of pixels and aspect ratio of the second projection image, the position and size maximizing the second area 520 in which the second projection image corrected based on the shape information acquired by the feature acquirer 411 is projected within the projection area 500 excluding the determined first area 510 and exclusion area 530.

Then, after determining the first area 510 and the second area 520 by any of the above three methods, the area determiner 412 projects a given pattern corrected based on the shape information in the determined first area 510 and second area 520 on the projection surface 200 by means of the projection device 100 and captures an image by means of the imaging device 300. Then, the area determiner 412 checks whether the pattern appearing in the captured image matches the given pattern and then ends the determination of the first area 510 and the second area 520.

The projection controller 413 corrects the first projection image and the second projection image based on the feature acquired by the feature acquirer 411, and projects the corrected first projection image and second projection image in the first area 510 and second area 520 determined by the area determiner 412, respectively by means of the projection device 100. For example, the projection controller 413 corrects the first projection image and the second projection image based on the shape information and the color information acquired by the feature acquirer 411. Then, the projection controller 413 outputs the corrected first projection image and second projection image to the projection device 100, whereby the corrected first projection image and second projection image are projected in the first area 510 and second area 520 of the projection area 500.

Figure 6:
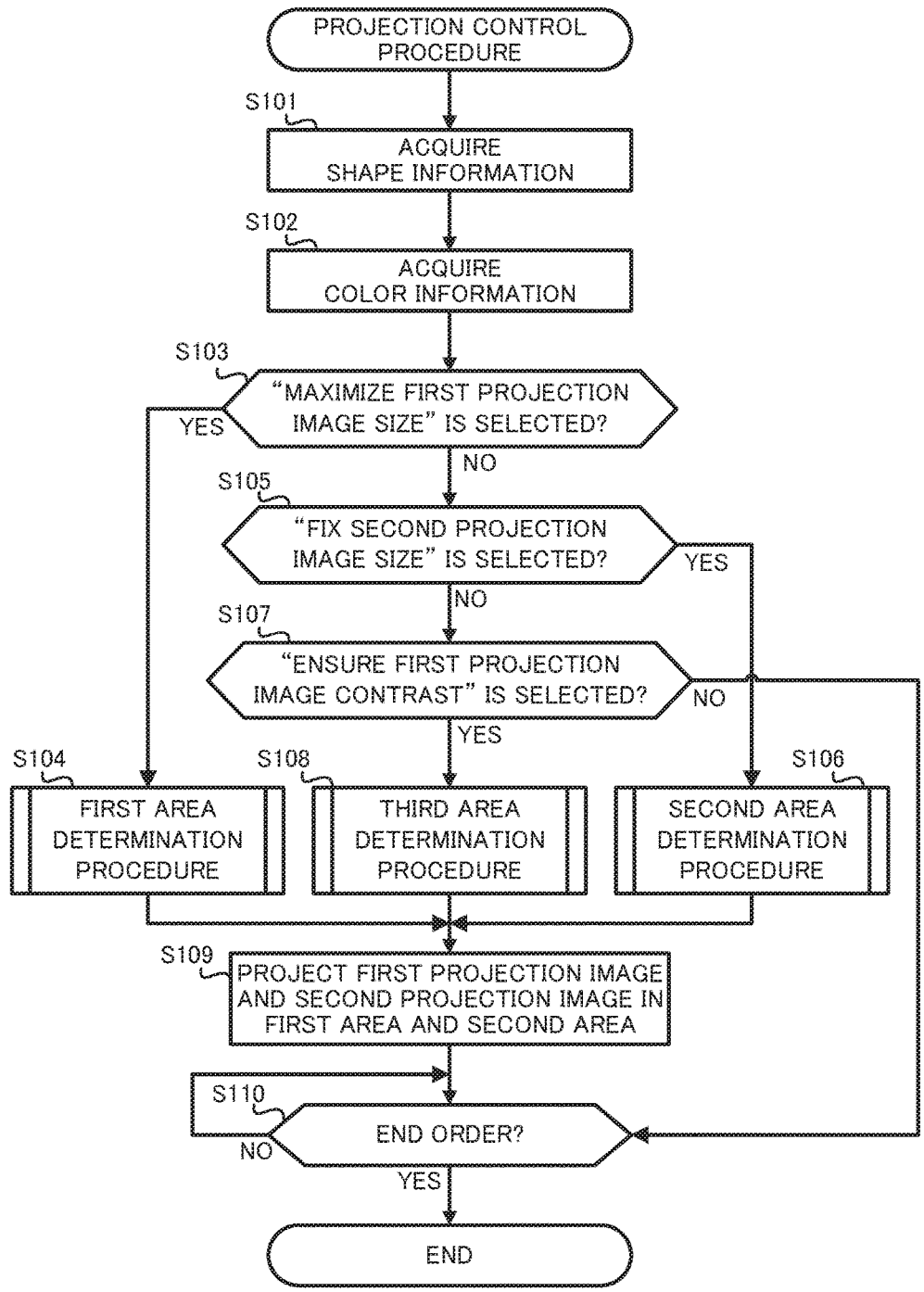
FIG. 6 is a chart showing an exemplary flowchart of the projection control procedure according to the embodiment.

The projection control procedure executed by the controller 401 of the projection control device 400 according to this embodiment will be described next. FIG. 6 is an exemplary flowchart of the projection control procedure according to this embodiment. For example, triggered by reception of operation input giving an order to start this procedure via the inputter 404, this projection control procedure starts.

First, the feature acquirer 411 projects a given pattern on the projection surface 200 and acquires a captured image thereof to acquire the correspondence between projection pixels of the projection device 100 and captured image pixels of the imaging device 300 as shape information (Step S101).

Then, the feature acquirer 411 captures an image of the projection surface 200 by means of the imaging device 300, and calculates based on the captured image and acquires as color information a correction amount for each pixel for cancelling the color and/or the pattern of the projection surface 200 (Step S102).

Then, the area determiner 412 determines whether "MAXIMIZE FIRST PROJECTION IMAGE SIZE" presenting the above first determination method is selected by the user via the inputter 404 (Step S103). If the area determiner 412 determines that the "MAXIMIZE FIRST PROJECTION IMAGE SIZE" is selected (Step S103; Yes), the area determiner 412 executes the first area determination procedure (Step S104).

FIG. 7 is an exemplary flowchart of the first area determination procedure according to this embodiment. As the first area determination procedure starts, the area determiner 412 identifies the number of pixels and the aspect ratio of each of the first projection image and the second projection image (Step S201).

Then, the area determiner 412 determines, based on the identified number of pixels and aspect ratio of the first projection image, the position and size maximizing the first area 510 in which the first projection image corrected based on the shape information acquired in the Step S101 shown FIG. 6 is projected within the projection area 500 (Step S202).

Then, the area determiner 412 determines, based on the identified number of pixels and aspect ratio of the second projection image, the position and size maximizing the second area 520 in which the second projection image corrected based on the shape information acquired in the Step S101 shown FIG. 6 is projected within the projection area 500 excluding the first area 510 determined in the Step S202 (Step S203).

Then, the area determiner 412 projects a given pattern corrected based on the shape information in the first area 510 and the second area 520 determined in the Steps S202 and S203 on the projection surface 200 by means of the projection device 100 and captures an image by means of the imaging device 300 (Step S204).

Then, the area determiner 412 determines whether the pattern appearing in the captured image captured in the Step S204 matches the given pattern (Step S205). If the area determiner 412 determines that the pattern appearing in the captured image does not match the given pattern are not equal (Step S205; No), the area determiner 412 returns to the Step S202 and redetermines the first area 510 and the second area 520. If the area determiner 412 determines that the pattern appearing in the captured image matches the given pattern (Step S205; Yes), the area determiner 412 ends the first area determination procedure and proceeds to Step S109 of FIG. 6.

Returning to FIG. 6, if the area determiner 412 determines that the "MAXIMIZE FIRST PROJECTION IMAGE SIZE" is not selected (Step S103; No), the area determiner 412 determines whether "FIX SECOND PROJECTION IMAGE SIZE" presenting the above second determination method is selected by the user via the inputter 404 (Step S105). If the area determiner 412 determines that the "FIX SECOND PROJECTION IMAGE SIZE" is selected (Step S105; Yes), the area determiner 412 executes the second area determination procedure (Step S106).

FIG. 8 is an exemplary flowchart of the second area determination procedure according to this embodiment. As the second area determination procedure starts, the area determiner 412 identifies the number of pixels and the aspect ratio of each of the first projection image and the second projection image (Step S301).

Then, the area determiner 412 determines, based on the identified number of pixels and aspect ratio of the first projection image, the position and size maximizing the first area 510 in which the first projection image corrected based on the shape information acquired in the Step S101 shown FIG. 6 is projected within the projection area 500 (Step S302).

Then, the area determiner 412 determines, based on the identified number of pixels and aspect ratio of the second projection image, whether the second area 520 of a given size in which the second projection image corrected based on the shape information acquired by the feature acquirer 411 is projected is ensured within the projection area 500 excluding the first area 510 determined in the Step S302 (Step S303).

If the area determiner 412 determines that the second area 520 is not ensured (Step S303; No), the area determiner 412 reduces the size of the first area 510 determined in the Step S302 by a given percentage (for example, 10%) (Step S304). Then, the area determiner 412 returns to the Step S303 and repeats the Steps S303 and S304 until the second area 520 is ensured.

If the area determiner 412 determines that the second area 520 is ensured (Step S303; Yes), the area determiner 412 projects a given pattern corrected based on the shape information in the first area 510 and the second area 520 determined in the Steps S302 to S304 on the projection surface 200 by means of the projection device 100 and captures an image by means of the imaging device 300 (Step S305).

Then, the area determiner 412 determines whether the pattern appearing in the captured image captured in the Step S305 matches the given pattern (Step S306). If the area determiner 412 determines that the pattern appearing in the captured image does not match the given pattern (Step S306; No), the area determiner 412 returns to the Step S302 and redetermines the first area 510 and the second area 520. If the area determiner 412 determines that the pattern appearing in the captured image matches the given pattern (Step S306; Yes), the area determiner 412 ends the second area determination procedure and proceeds to Step S109 of FIG. 6.

Returning to FIG. 6, if determined that the "FIX SECOND PROJECTION IMAGE SIZE" is not selected (Step S105; No), the area determiner 412 determines whether "ENSURE FIRST PROJECTION IMAGE CONTRAST" presenting the above third determination method is selected by the user via the inputter 404 (Step S107). If the area determiner 412 determines that the "ENSURE FIRST PROJECTION IMAGE CONTRAST" is selected (Step S107; Yes), the area determiner 412 executes the third area determination procedure (Step S108).

FIG. 9 is an exemplary flowchart of the third area determination procedure according to this embodiment. As the third area determination procedure starts, the area determiner 412 extracts an exclusion area 530 of the projection area 500 in which the contrast of the first projection image does not satisfy a given condition based on the color information acquired in the Step S102 of FIG. 6 (Step S401).

Then, the area determiner 412 identifies the number of pixels and the aspect ratio of each of the first projection image and the second projection image (Step S402).

Then, the area determiner 412 determines, based on the identified number of pixels and aspect ratio of the first projection image, the position and size maximizing the first area 510 in which the first projection image corrected based on the shape information acquired in the Step S101 shown in FIG. 6 is projected within the projection area 500 excluding the exclusion area 530 extracted in the Step S401 (Step S403).

Then, the area determiner 412 determines, based on the identified number of pixels and aspect ratio of the second projection image, the position and size maximizing the second area 520 in which the second projection image corrected based on the shape information acquired in the Step S101 shown in FIG. 6 is projected within the projection area 500 excluding the first area 510 determined in the Step S403 and the exclusion area 530 extracted in the Step S401 (Step S404).

Then, the area determiner 412 projects a given pattern corrected based on the shape information in the first area 510 and the second area 520 determined in the Steps S403 and S404 on the projection surface 200 by means of the projection device 100 and captures an image by means of the imaging device 300 (Step S405).

Then, the area determiner 412 determines whether the pattern appearing in the captured image captured in the Step S405 matches the given pattern are equal (Step S406). If the area determiner 412 determines that the pattern appearing in the captured image does not match the given pattern (Step S406; No), the area determiner 412 returns to the Step S403 and redetermines the first area 510 and the second area 520.

If the area determiner 412 determines that the pattern appearing in the captured image matches the given pattern (Step S406; Yes), the area determiner 412 ends the third area determination procedure and proceeds to Step S109 of FIG. 6.

Returning to FIG. 6, the projection controller 413 corrects the first projection image and the second projection image based on the shape information and the color information acquired in the Step S101 and Step S102 and outputs to the projection device 100 the corrected first projection image and second projection image to project in the first area 510 and the second area 520 determined by the area determiner 412 (Step S109). Here, the acquired shape information and color information are different between the first area 510 and the second area 520 and therefore, the projection controller 413 makes correction in each area, not uniformly.

Then, the controller 401 determines whether operation input to end the projection control procedure is received from the user via the inputter 404 (Step S110). If the controller 401 determines that no operation input to end is received (Step S110; No), the controller 401 continues to project the first projection image and the second projection image until operation input to end is received. On the other hand, if the controller 401 determines that operation input to end is received (Step S110; Yes) or if the controller 401 determines that the "ENSURE FIRST PROJECTION IMAGE CONTRAST" is not selected (Step S107; No), the controller 401 ends this procedure.

As described above, the projection control device 400 according to this embodiment determines the first area 510 and the second area 520 in which the first projection image and the second projection image corrected based on the feature of the projection surface 200 acquired by the feature acquirer 411 are projected, respectively. Thus, even if the first projection image is reduced in size by correction, since the second area 520 in which the second projection image is projected is disposed in an area of the projection area 500 other than the first area 510 in which the first projection image is projected, wasted space in which no projection image is projected can be reduced in the projection area 500, whereby the projection area 500 can usefully be used.

Moreover, the projection control device 400 determines the first area 510 maximized within the projection area 500 and determines the second area 520 maximized within the projection area 500 excluding the determined first area 510. Thus, the projection control device 400 can fulfil the need of the user wishing to watch the first projection image as large as possible.

Moreover, the projection control device 400 determines the second area 520 of a given size and determines the first area 510 maximized within the projection area 500 excluding the determined second area 520. Thus, for example for the second projection image including textual information, the projection control device 400 can fulfil the need of the user wishing to watch the first projection image as large as possible while ensuring the second area 520 of a size in which the textual information is legible.

Moreover, the projection control device 400 determines the first area 510 maximized within an area of the projection area 500 in which the contrast of the first projection image satisfies a given condition and determines the second area 520 maximized within the projection area 500 excluding the determined first area 510. Thus, even if the projection surface 200 includes an uncorrectable color and/or pattern and an exclusion area 530 in which a desired contrast of the first projection image is not ensured is present, the projection control device 400 determines the maximum first area 510 within the projection area 500 excluding the exclusion area 530, whereby the projection control device 400 can fulfil the need of the user wishing to watch the first projection image as large as possible in a desired contrast.

An embodiment is described above. The above-described embodiment is given by way of example and the specific configuration of the projection control device 400 and the contents of the projection control procedure are not confined to those described in the above embodiment and can be modified as follows.

For example, in the above-described embodiment, three methods executed by the projection control device 400 for determining the first area 510 and the second area 520 are described. However, the method of determining the first area 510 and the second area 520 are not confined to those methods. For example, the projection control device 400 may determine the second area 520 having a given number of pixels and determine the first area 510 maximized within the projection area 500 excluding the determined second area 520. Moreover, the projection control device 400 may determine the first area 510 and the second area 520 having a given area ratio and maximized within the projection area 500. Moreover, the projection control device 400 may determine the first area 510 and the second area 520 so that the contrast ratios of the first projection image and the second projection image are maximized based on the acquired color information.

Moreover, the projection control device 400 according to the present disclosure can be realized by a conventional computer, not by a dedicated device. For example, the projection control device 400 may be realized by a computer executing a program. The program for realizing the function of the projection control device 400 may be stored on a non-transitory computer-readable storage medium such as a universal serial bus (USB), a compact disc read only memory (CD-ROM), a digital versatile disc (DVD), and an HDD, or downloaded onto a computer via a network.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A projection control device comprising a hardware processor,
    wherein the hardware processor is configured to:
        acquire a shape of a projection surface as a feature;
        detect a projection area that is maximized and projectable on the projection surface based on the acquired feature, wherein the projection surface includes a curved surface or pattern;
        determine a first area in which a first projection image corrected based on the acquired feature of the projection surface is projected to maximize the first area within the projection area in the detected projection area;
        determine a second area in which a second projection image corrected based on the feature of the projection surface is projected to maximize the second area within the projection area excluding the determined first area; and control a projection device to project the first projection image in the first area and project the second projection image in the second area.

2. The projection control device according to claim 1, wherein the hardware processor is configured to acquire at least one of a shape or color of the projection surface as the feature.

3. The projection control device according to claim 1, wherein the hardware processor is configured to:
determine the first area maximized within the projection area, and
determine the second area maximized within the projection area excluding the determined first area.

4. The projection control device according to claim 1, wherein the hardware processor is configured to:
determine the second area of a given size in the projection area, and
determine the first area maximized within the projection area excluding the determined second area.

5. The projection control device according to claim 1, wherein the hardware processor is configured to:
determine the first area maximized within an area of the projection area in which a contrast of the first projection image satisfies a given condition, and
determine the second area maximized within the projection area excluding the determined first area.

6. The projection control device according to claim 1, wherein the first projection image and the second projection image are corrected based on the acquired feature of the projection surface while keeping their aspect ratios.

7. The projection control device according to claim 1, wherein the second projection image presents information relating to information presented by the first projection image.

8. The projection control device according to claim 1, wherein the second projection image presents emergency information or a current time.

9. The projection control device according to claim 1, wherein the first area and the second area are rectangular in shape.

10. A projection control method comprising:
a feature acquisition step of acquiring a shape of a projection surface as a feature;
a projection area detection step of detecting a projection area that is maximized and projectable on the projection surface based on the acquired feature, wherein the projection surface includes a curved surface or pattern;
an area determination step of determining a first area in which a first projection image corrected based on the acquired feature of the projection surface is projected to maximize the first area within the projection area in the detected projection area, and determining a second area in which a second projection image corrected based on the feature of the projection surface is projected to maximize the second area within the projection area excluding the determined first area; and
a projection control step of controlling a projection device to project the first projection image in the first area and project the second projection image in the second area.

11. A non-transitory storage medium encoded with a computer-readable program that enables a computer to execute a method comprising:
acquiring a shape of a projection surface as a feature;
detecting a projection area that is maximized and projectable on the projection surface based on the acquired feature, wherein the projection surface includes a curved surface or pattern;
determining a first area in which a first projection image corrected based on the acquired feature of the projection surface is projected to maximize the first area within the projection area in the detected projection area;
determining a second area in which a second projection image corrected based on the feature of the projection surface is projected to maximize the second area within the projection area excluding the determined first area; and
controlling a projection device to project the first projection image in the first area and project the second projection image in the second area.

* * * * *